No. 743,654. PATENTED NOV. 10, 1903.
J. F. McELROY.
ELECTRIC CAR HEATER.
APPLICATION FILED SEPT. 2, 1903.
NO MODEL. 2 SHEETS—SHEET 1.
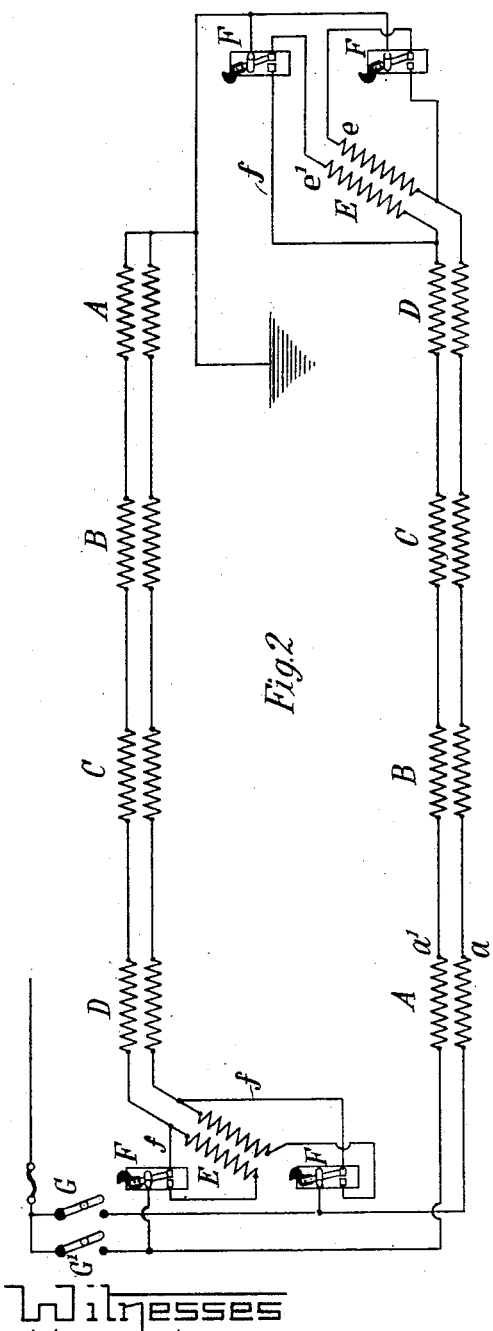
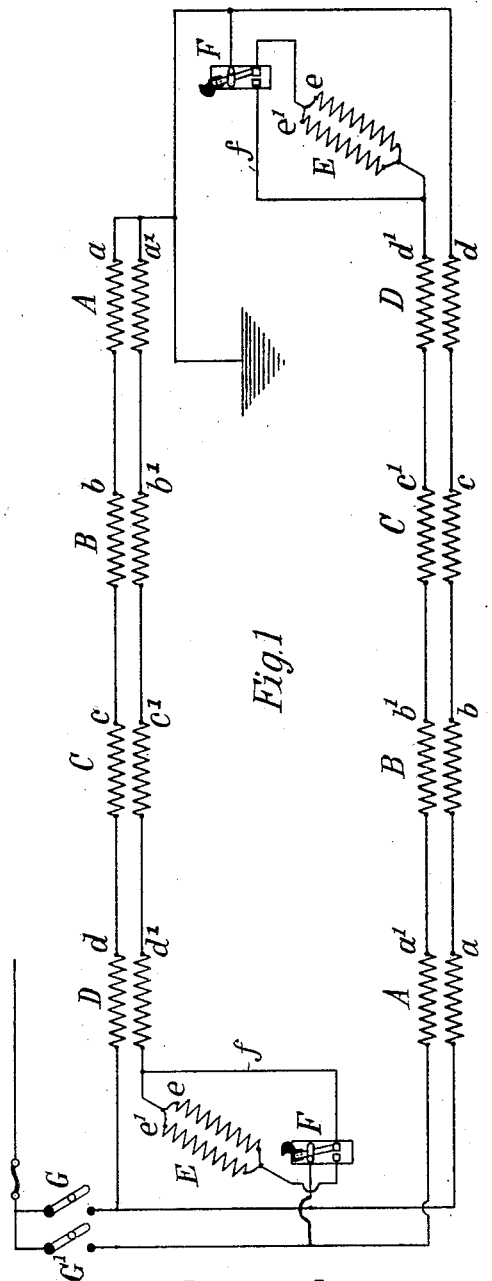
Witnesses
L. T. Shaw
G. D. Cosgrove
Inventor
James F. McElroy
by E. M. Bentley Atty.

No. 743,654. PATENTED NOV. 10, 1903.
J. F. McELROY.
ELECTRIC CAR HEATER.
APPLICATION FILED SEPT. 2, 1903.
NO MODEL. 2 SHEETS—SHEET 2.
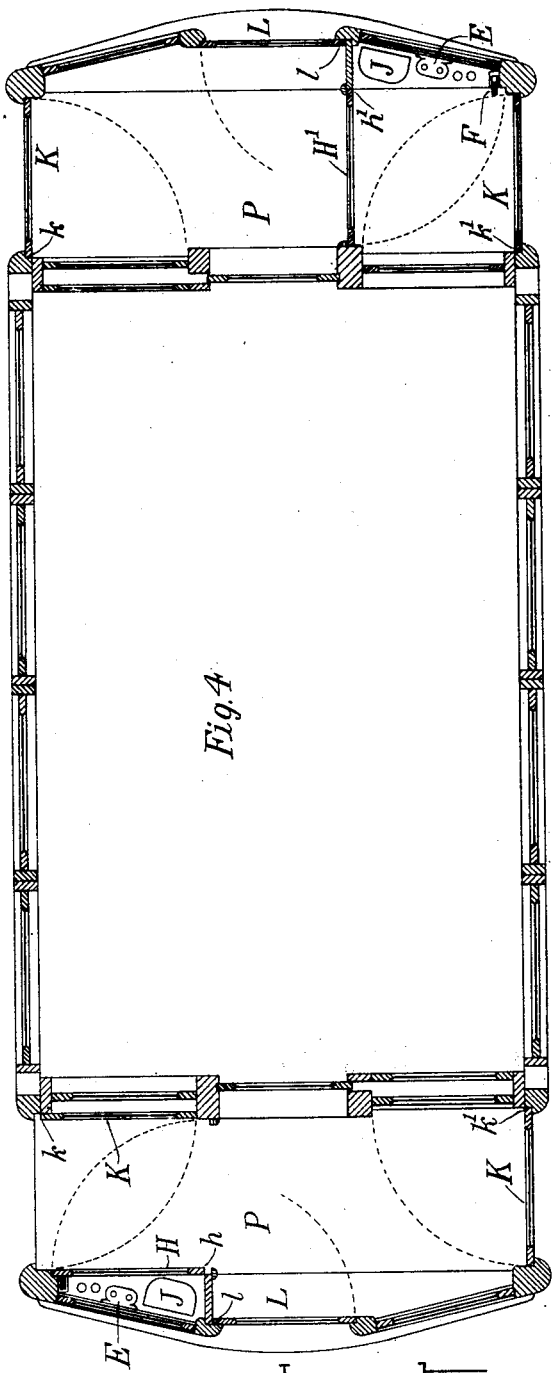
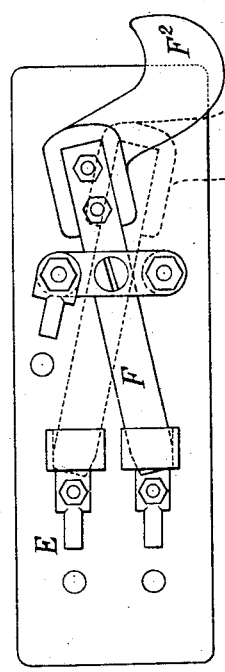
Witnesses
L. T. Shaw
G. D. Cosgrove
Inventor
James F. McElroy
by E. M. Bentley Atty.

No. 743,654. Patented November 10, 1903.

UNITED STATES PATENT OFFICE.

JAMES F. McELROY, OF ALBANY, NEW YORK, ASSIGNOR TO CONSOLIDATED CAR HEATING COMPANY, OF ALBANY, NEW YORK, A CORPORATION OF WEST VIRGINIA.

ELECTRIC CAR-HEATER.

SPECIFICATION forming part of Letters Patent No. 743,654, dated November 10, 1903.

Application filed September 2, 1903. Serial No. 171,704. (No model.)

*To all whom it may concern:*

Be it known that I, JAMES F. McELROY, a citizen of the United States, residing at Albany, county of Albany, and State of New York, have invented certain new and useful Improvements in Electric Car-Heaters, of which the following specification and its accompanying drawings set forth, as an illustration, that form of the invention which I now consider the best out of the various forms in which the principles of the invention may be embodied.

In the drawings, Figures 1 and 2 are diagrams of the circuits involved in my invention. Fig. 3 shows the cut-out switch for the vestibule-heater. Fig. 4 is a plan of a car provided with my device.

In electric railway-cars provided with vestibules or with special compartments for the motorman it becomes necessary in many cases to provide a special electric heater for the said vestibule or compartment additional to and separate from those provided for heating the body of the vehicle. Moreover, in some cases the door of the compartment is so arranged that when opened it will swing back in such a manner as to cover and inclose the controller, brakes, and electric heater in a smaller compartment or recess, wherein the heater if left in action would not only waste the current energy, but would heat the small recess to a dangerous degree. I have therefore provided such a special heater for the vestibule or motorman's compartment in an electric car and have devised a controlling-switch therefor that may be operated by the door of the vestibule or compartment so as to energize the heater when the door is closed and deënergize it when the door is opened with respect to the compartment but closed with respect to the recess containing the controllers and heater.

Referring to Fig. 1, A, B, C, and D represent the ordinary electric heaters in the body of a railway-car, each, preferably, comprising two heating elements $a\ a'\ b\ b'\ c\ c'$, &c. The several elements $a\ b\ c$, &c., are connected in series with one another in one circuit controlled by switch G and the elements $a'\ b'\ c'$, &c., which are of larger capacity, in a second circuit controlled by switch G'. As usual, the first circuit will be used to give the lowest degree of heat, the second one to give a medium degree, and both first and second to give the highest degree. E E are the vestibule-heaters, which in the arrangement of this figure are in series with the heating elements $a'\ b'\ c'$ of the second circuit so long as they (the heaters E E) are energized, but are open-circuited when deënergized by the switch F contacting with the shunting-conductor $f$. This assumes that the vestibules will not require heat when the temperature is such as to demand only the lowest degree of heat in the body of the car and that the medium degree of heat will be sufficient for the vestibule whenever heat is required there.

In Fig. 2 the arrangement is the same, except that the sections $e$ and $e'$ of heater E are included when energized in the first and second circuits, respectively, while each is provided with an individual switch F and an individual open-circuiting conductor $f$. Both switches F will be simultaneously operated, and when turned to the heater-circuits instead of the short-circuiting conductors $f$ the degree of heat in the vestibule will be controlled by the switches G and G', like that of the other heaters in the body of the car.

The switch F is shown in Fig. 3 as consisting of a simple knife-blade lever, with a cam-shaped extension $P^2$ on the outer end of the lever, designed to be engaged by the door H and thrown thereby from the dotted-line position to the full-line position shown in the figure. It is turned by hand into the former position, where it contacts with the terminal leading to the heater E, while the door forces it to the latter positions, where it contacts with the terminal leading to the open-circuiting conductor $f$. It may be located either above or below the door, as desired.

Fig. 4 shows one particular arrangement in which I purpose to employ my invention, this being the arrangement adopted for the subway-cars in New York city. Here the platforms P of the cars are provided each with two side doors K K, hinged at the points $k\ k'$, an end door L, hinged at the point $l$, and a division-door H and H', respectively hinged at $h\ h'$. The division-doors serve to shut off the right-hand corner (facing forward from the car) of each platform to provide a motorman's compartment separate from the remainder of the inclosed platform. Within this compartment in a recess formed by the bay of the platform are located the controller J, the heater E, also the brake-levers and other apparatus. The division-door H at the left end of the car is shown as turned back to open up the platform and inclose the recess containing the said apparatus. At this end also one of the side doors K is closed and the other is opened. At the right end the division-door H' is closed, as well as both of the side doors. The closure of door H' shuts off the motorman's compartment and exposes within that compartment the controlling and other apparatus. The switch F is located to the right of the heater E, and the swinging of the doors H and H' operate it as above described to open-circuit the heater E when in the position of door H, but to throw the heater in circuit when in the position of door H'. By this means the heater will not remain energized and overheat the controller-recess, but will be automatically thrown when the motorman leaves his compartment and turns the division-door to open his compartment as a part of the platform.

What I claim as new, and desire to secure by Letters Patent, is—

1. The combination with an electric heater for the vestibule of a railway-car of a switch therefor having its operating part located in the line of movement of the vestibule-door so as to be actuated thereby.

2. The combination with an electric heater for the vestibule of a railway-car having a plurality of heater-sections of a controlling-switch for each section and means for operating said switches by the door of the vestibule.

3. The combination with a series of car-heaters having a plurality of heater-sections arranged in separate circuits, switches controlling said circuits, a vestibule-heater having sections adapted to be included in said circuits respectively, individual switches for said sections and means for operating said switches by the vestibule-door.

4. The combination in a railway-car of a vestibule-door closing a recess or compartment containing the controller and heater, and a heater-switch operated by said door.

5. The combination in a railway-car, of a vestibule-door closing a recess containing the controller and heater, and a switch for the heater operated by said door and serving to energize the heater when unclosing and de-energizing it when closing the recess.

6. The combination in a railway-car, of a vestibule having side doors and a division-door, a vestibule-heater and a controlling-switch therefor operated by the division-door.

In witness whereof I have hereunto set my hand, before two subscribing witnesses, this 17th day of August, 1903.

JAMES F. McELROY.

Witnesses:
BEULAH CARLE,
WILLIAM A. MORRILL, Jr.